US008570861B1

(12) United States Patent
Brandwine et al.

(10) Patent No.: US 8,570,861 B1
(45) Date of Patent: Oct. 29, 2013

(54) REPUTATION-BASED NETWORKING

(75) Inventors: Eric Jason Brandwine, Haymarket, VA (US); Swaminathan Sivasubramanian, Seattle, WA (US); Bradley E. Marshall, Bainbridge Island, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 530 days.

(21) Appl. No.: 12/825,824

(22) Filed: Jun. 29, 2010

(51) Int. Cl.
*G01R 31/08* (2006.01)
*H04L 12/28* (2006.01)
*G06F 15/16* (2006.01)
*G06F 15/173* (2006.01)
*G06F 7/04* (2006.01)
*G06F 11/00* (2006.01)

(52) U.S. Cl.
USPC ........... 370/230; 370/252; 370/390; 709/203; 709/224; 709/240; 726/6; 714/4

(58) Field of Classification Search
USPC .......... 370/230, 252, 254, 390; 709/240, 249, 709/203, 224; 726/6; 714/4
See application file for complete search history.

(56) References Cited

U.S. PATENT DOCUMENTS

2007/0107059 A1* 5/2007 Chasin et al. .................... 726/23
2007/0297405 A1* 12/2007 He ................................ 370/389
2008/0175266 A1* 7/2008 Alperovitch et al. ......... 370/465
2009/0287819 A1* 11/2009 Iverson .......................... 709/225

OTHER PUBLICATIONS

How the 'Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.
B. Pfaff, et al., Extending Networking into the Virtualization Layer, Proceedings of the 8th ACM Workshop on Hot Topics in Networks (HotNets—VIII), New York City, New York (Oct. 2009).
Towards a Next Generation Data Center Architecture: Scalability and Commoditization; Albert Greenberg, et al.; dated Aug. 22, 2008.
Counter Hack Reloaded a Step-By-Step Guide to Computer Attacks and Effective Defenses, Second Edition, Ed Skoudis, et al., dated Nov. 2006, pp. 59-66.

* cited by examiner

*Primary Examiner* — Alpus H Hsu
*Assistant Examiner* — Dharmesh Patel
(74) *Attorney, Agent, or Firm* — Knobbe, Martens, Olson & Bear LLP

(57) ABSTRACT

When one actor or network within a broader system of networks is announcing numerous routes or otherwise performing "poorly," the neighboring networks can suffer because of the strain that the poorly performing network puts on resources. Typically, in order to counteract the effects of a poorly performing neighboring network, a router may simply stop accepting changes or stop accepting packets from the poorly performing neighbor. Some network participants may only temporarily be acting poorly and straining its neighbors' resources, however. Therefore, in some of the embodiments, a reputation score or level for a network participant may be determined based on its actions over time. This reputation may be used to determine whether, when, and how to act on the network request from the participant.

23 Claims, 14 Drawing Sheets

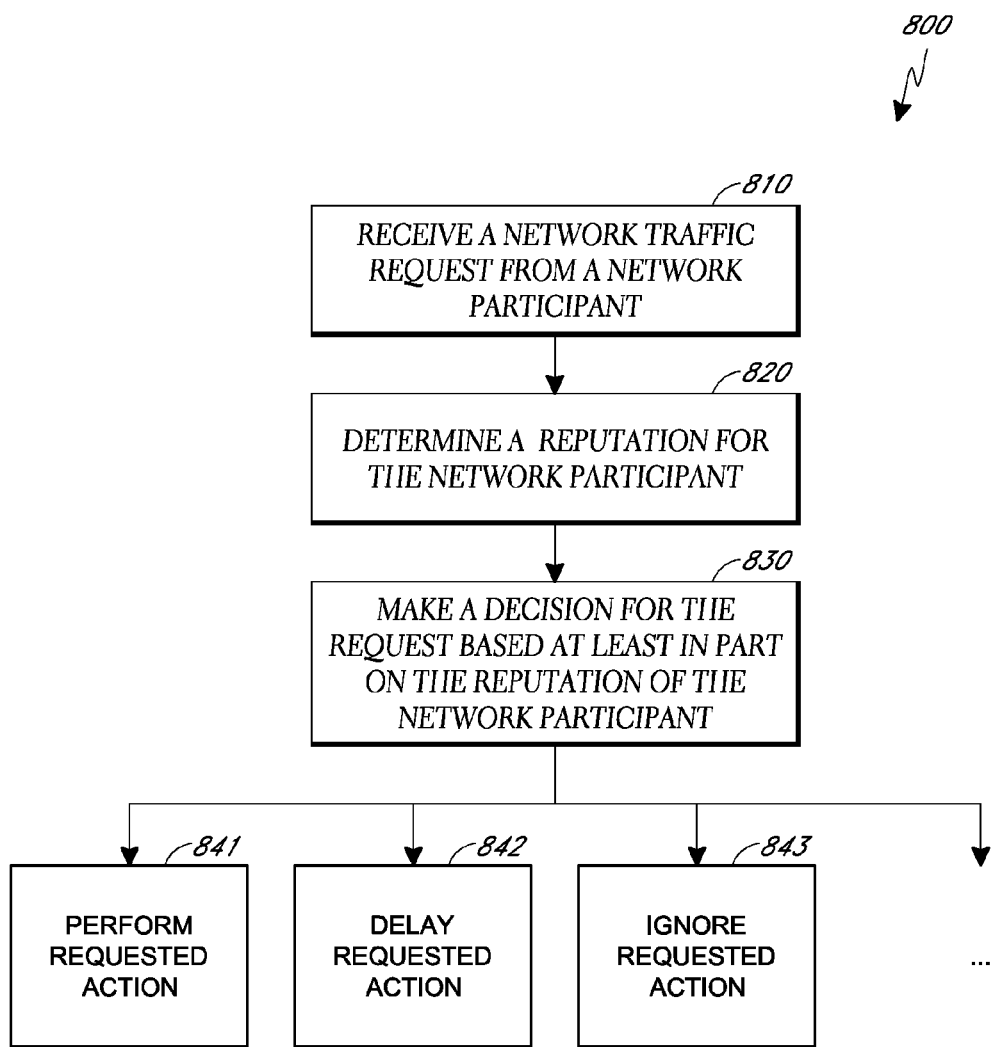

REPUTATION-BASED NETWORKING

BACKGROUND

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted a multiple physical networks, or subnetworks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the control plane functionality, routers can maintain a forwarding information base ("FIB") that identifies, among other packet attribute information, destination information for at least a subset of possible network addresses, such as Internet Protocol ("IP") addresses. In a typical embodiment, the FIB corresponds to a table of values specifying network forwarding information for the router.

With the advent of virtualization technologies, networks and routing for those networks can now be simulated using commodity hardware rather than actual routers. For example, virtualization technologies such as those provided by VMWare, XEN, or User-Mode Linux may allow a single physical computing machine to be shared among multiple virtual networks by providing each virtual network user with one or more virtual machines hosted by the single physical computing machine, with each such virtual machine being a software simulation acting as a distinct logical computing system that provides users with the illusion that they are the sole operators and administrators of a given hardware computing resource. In addition, as routing is accomplished through software, additional routing flexibility is provided to the virtual network in comparison with traditional routing, such as allowing the use of supplemental information for determining network routing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 depicts a method for reputation-based networking;

DETAILED DESCRIPTION

Figure 1:
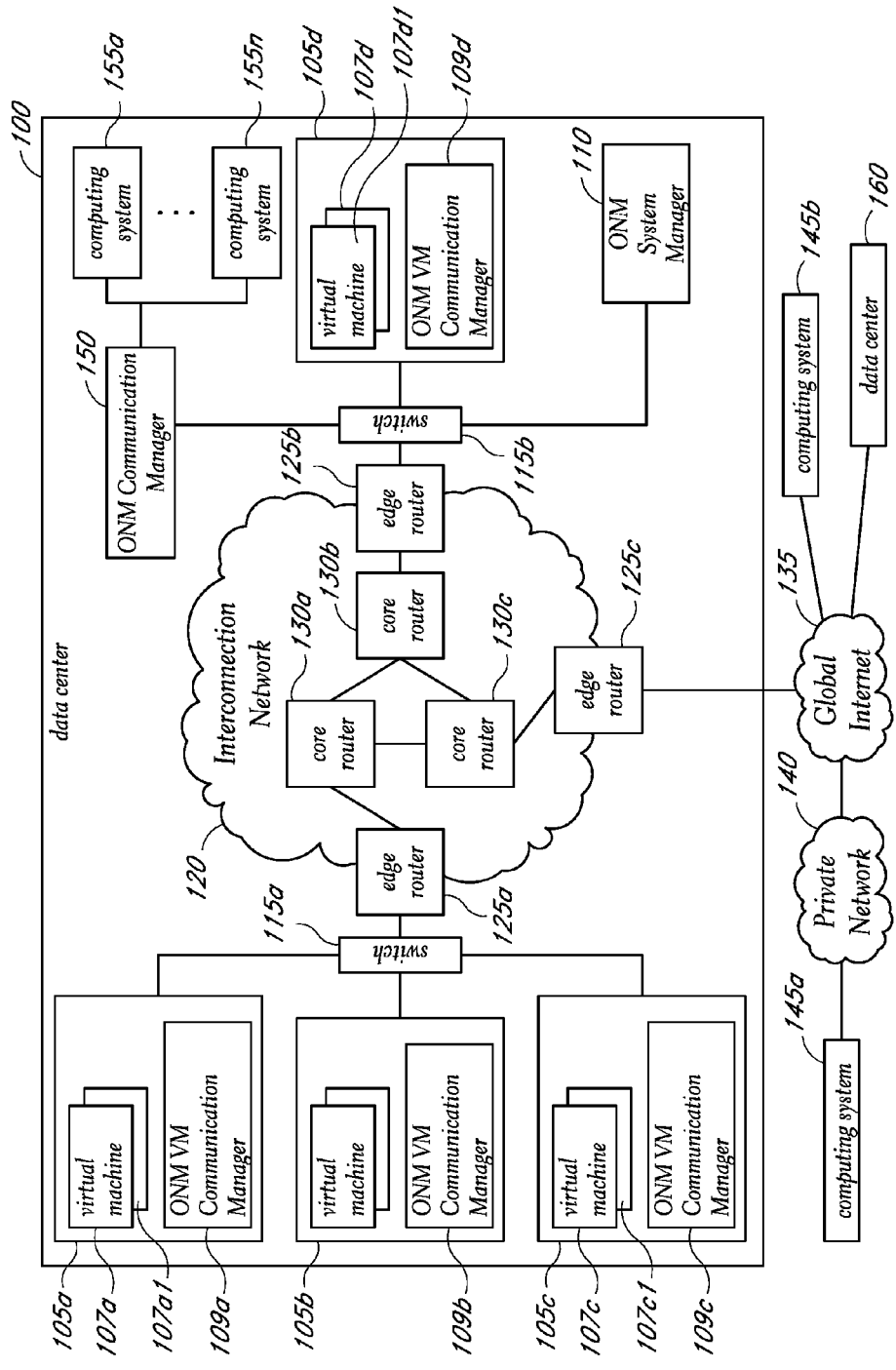
FIG. 1 is a network diagram illustrating an embodiment of a substrate network having computing nodes associated with a virtual computer network.

In a network, multiple computing systems are interconnected and interdependent. When one network makes a change, that change propagates through neighboring networks. In the case of physical network routing equipment, constraints on the number of routes that can be stored and the rate at which routes can be changed are often fixed or tightly constrained. For routing systems running in software, the constraints may be softer, but the available resources are not infinite. There are also limited resources for forwarding and switching packets. Therefore, whether we are dealing with routing in software or hardware, it can be beneficial to account for these constraints. When one actor or network within a broader system of networks is announcing numerous routes or otherwise performing "poorly," the neighboring networks can suffer because of the strain that the poorly performing network is placing on their resources.

Typically, in order to counteract the effects of a poorly performing neighboring network neighbor, a router may simply stop accepting changes or stop accepting packets from the poorly performing neighbor. This may not be the best solution, however. Some network participants may only temporarily be acting poorly and straining their neighbors' resources. Therefore, in some of the embodiments, a reputation score or level for the network participant can be determined based on a network participant's actions. This reputation can be used to determine whether to act and how to act on the network request from the participant.

In various embodiments herein, a router or other system responsible for accepting routing announcements from participants and/or accepting network traffic from participants can keep track of how the participants have acted or performed over time. For example, if a network announces more than a certain threshold of routing changes per time period, then that network may be assigned a lower reputation. If, on the other hand, a network neighbor normally performs well, then even if it temporarily announces numerous routing changes, then it can temporarily be assigned a slightly worse reputation, but still maintain a generally good reputation. In embodiments herein, it can be useful for a network participant to have a good reputation because its requested network routing actions (e.g., announcing routing changes or sending network traffic) can be more likely to be accepted or can be acted on more quickly. Network participants with poorer reputations can have their network routing activities delayed or ignored. Further, in some embodiments, a network participant may have a long term or other relationship that may affect its reputation (either positively or negatively).

The following section discusses various embodiments of managed networks for reputation-based networking. Following that is further discussion of reputation-based networking.

Managed Computer Networks for Reputation-Based Networking

With the advent of virtualization technologies, networks and routing for those networks can now be simulated using commodity hardware rather than actual routers. For example, virtualization technologies can be adapted to allow a single physical computing machine to be shared among multiple virtual networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. As a result, in some implementations, supplemental information other than packet information can be used to determine network routing.

In this disclosure, techniques are described for providing logical networking functionality for managed computer networks, such as for virtual computer networks that are provided on behalf of users or other entities. In at least some embodiments, the techniques enable a user to configure or specify a network topology, routing costs, and/or routing paths for a virtual or overlay computer network including logical networking devices that are each associated with a specified group of multiple physical computing nodes. With the network configuration specified for a virtual computer network, the functionally and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, a user's access and/or network traffic is transparent to other users. For example, even though physical components of a network may be shared, a user of a virtual network may not see another user's network traffic on another virtual network if monitoring traffic on the virtual network.

Figure 2:
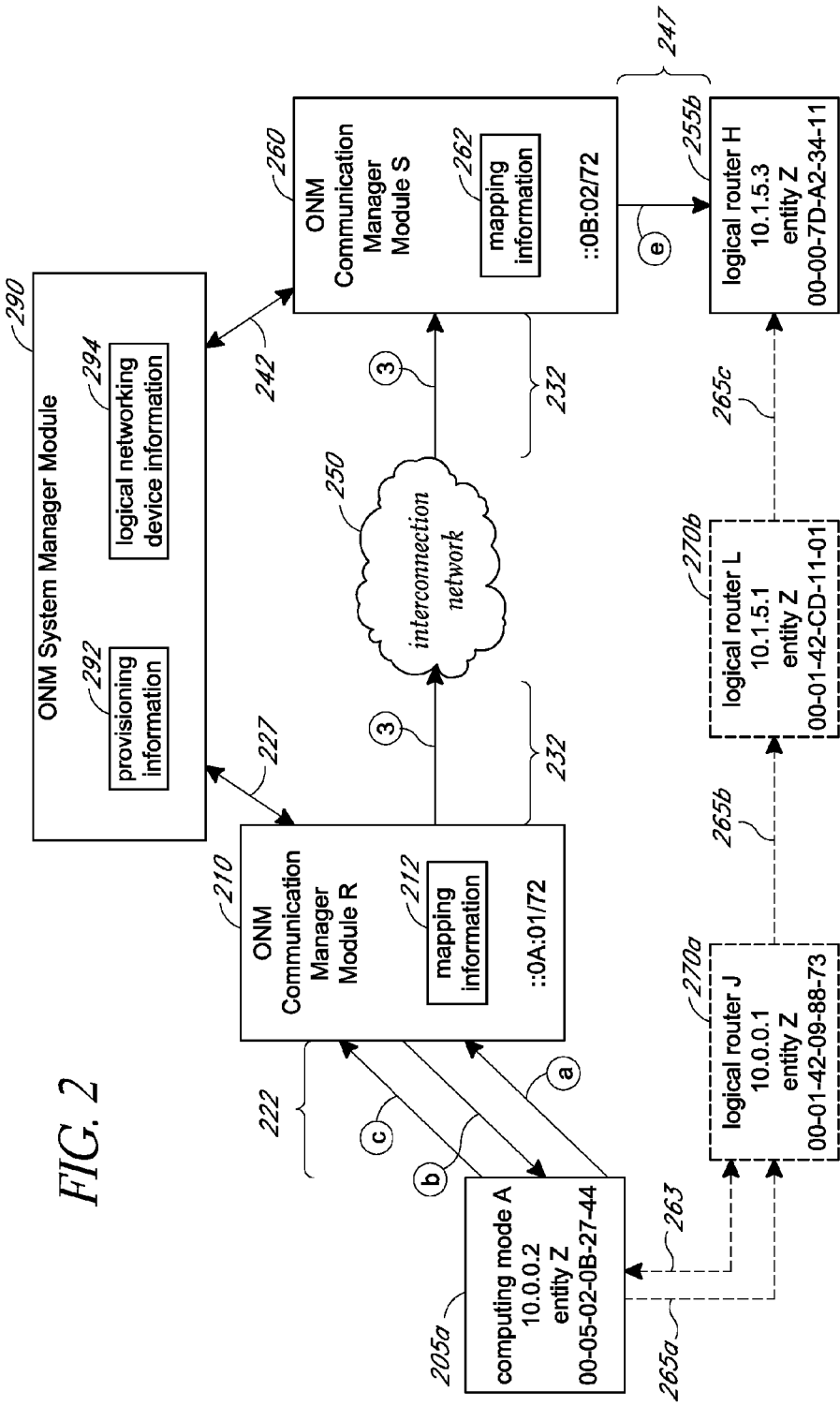
FIG. 2 illustrates an example embodiment of a virtual computer network supporting logical networking functionality.

By way of overview, FIGS. 1 and 2 discuss embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B discuss embodiments where substrate routing decisions can be made independently of any simulated routing in the overlay network, allowing, for example, optimization of traffic on the substrate network based on information unavailable to a virtual network user. FIGS. 5A-7A discuss embodiments where routing decisions implemented on the virtual or overlay network are propagated to the substrate network. Thus, a user can specify cost functions for the overlay network that can be used to make routing decisions in the substrate network.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the 1private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270a and 270b in logically sending the communication.

In this example, computing nodes A 205a and H 255b are part of a single virtual computer network for entity Z. However, computing nodes can be configured to be part of two distinct sub-networks of the virtual computer network and the logical router devices 270a and 270b separate the computing nodes A and H in the virtual network topology. For example, logical router device J 270a can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

In this example, computing node A 205a first sends an address resolution protocol (ARP) message request 222-a for virtual hardware address information, where the message is expected to first pass through a logical device J before being forwarded to computing node H. Accordingly, the ARP message request 222-a includes the virtual network address for logical router J (e.g., "10.0.0.1") and requests the corresponding hardware address for logical router J.

Communication Manager module R intercepts the ARP request 222-a, and obtains a hardware address to provide to computing node A as part of spoofed ARP response message 222-b. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-b. While request 222-a and response message 222-b actually physically pass between computing node A and Communication Manager module R, from the standpoint of computing node A, its interactions occur with local router device J.

After receiving the response message 222-b, computing node A 205a creates and initiates the sending of a communication 222-c to computing node H 255b. From the standpoint of computing node A, the sent communication will be handled as if logical router J 270a were physically implemented. For example, logical router J could modify the header of the communication 265a and forward the modified communication 265b to logical router L 270a, which would similarly modify the header of the communication 265b and forward the modified communication 265c to computing node H. However, communication 222-c is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-e by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270a, 270b and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

Figure 3:
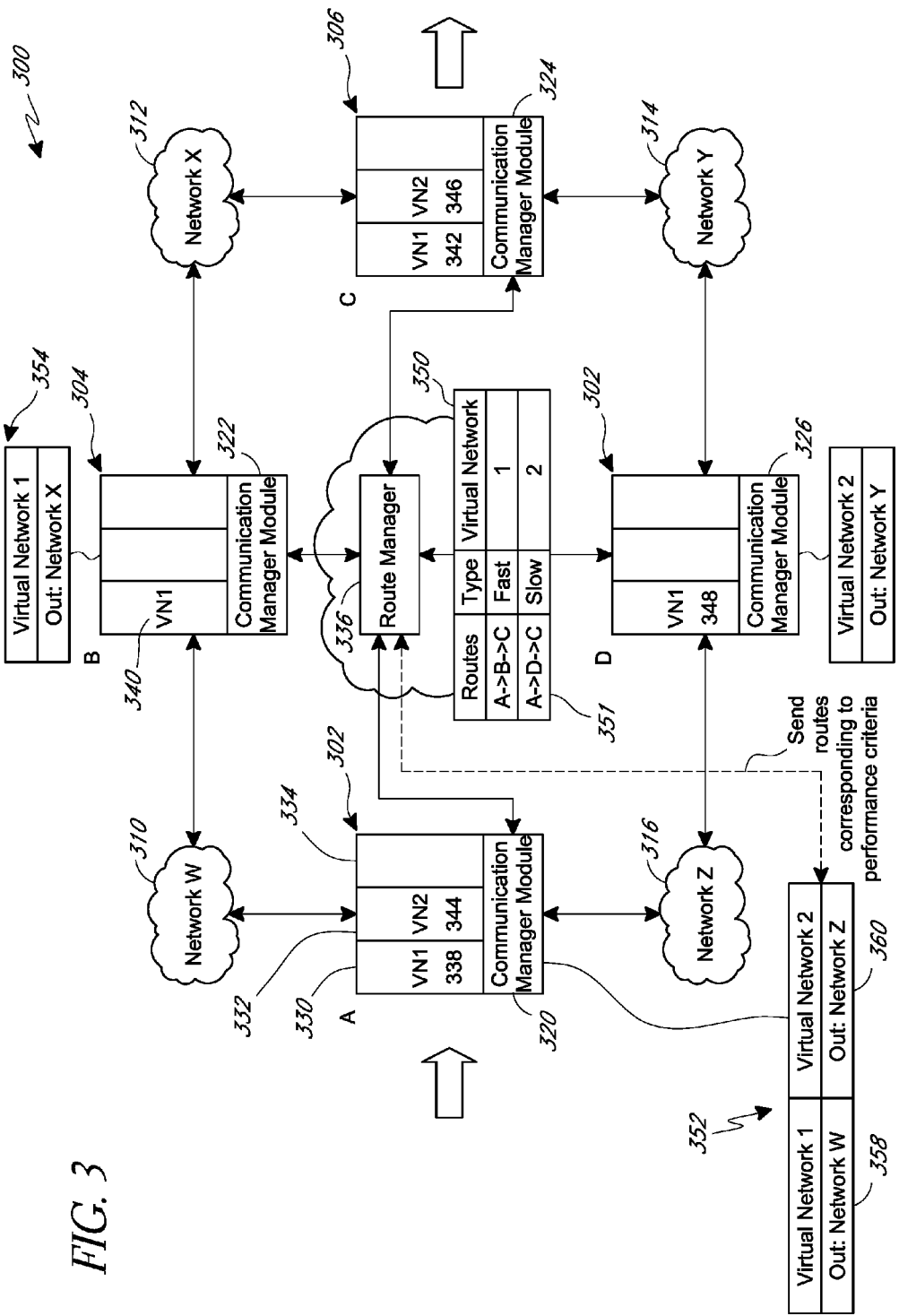
FIG. 3 illustrates an example embodiment of a substrate network configuration wherein routes are determined for associated overlay networks.

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be located on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109a, 109b, 109c, 109d of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual networks are associated with the substrate network 300. Virtual network 1 (VN1) has components 338, 340, 342, associated with virtual computing nodes on computing nodes A 302, B 304, and C 306. Virtual network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual networks, the Route Manager 336 can similarly generate and maintain routes for any number of virtual networks. Likewise, the substrate network 300 can include any number of computing nodes and/or physical network devices. Routes can be determined based on multiple performance criteria, such as network bandwidth, network security, network latency, and network reliability. For example, traffic for a virtual network suspected of being used for spamming (e.g. mass advertisement emailing) can be routed through network filters and scanners in order to reduce spam.

Figure 4A:
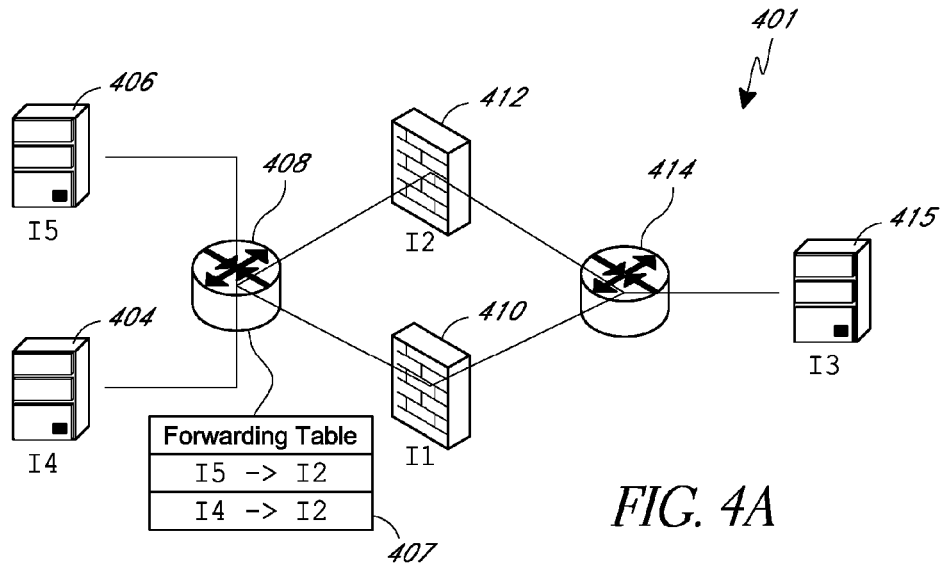
FIGS. 4A and 4B illustrate a virtual network and corresponding substrate network where substrate routing is independently determined from virtual routing.
Figure 4B:
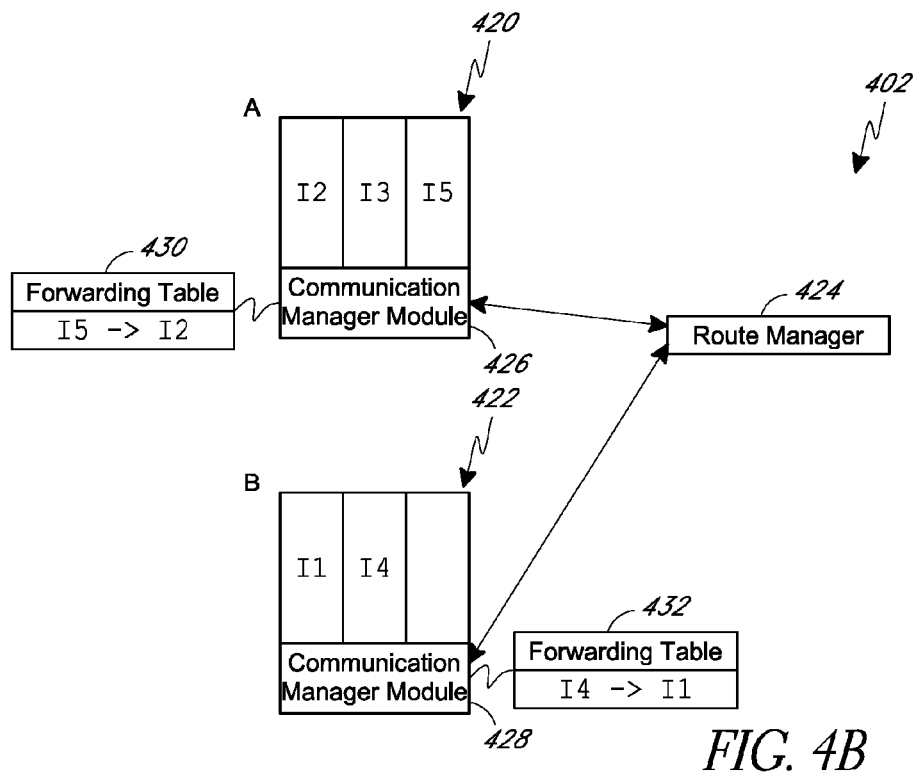

FIGS. 4A and 4B illustrate a virtual network 401 and corresponding substrate network 402 where substrate routing is independently determined from virtual routing. FIG. 4A illustrates a virtual network including several virtual network components. Virtual computing nodes I4 404 and I5 406 are connected to a logical router 408. The logical router can implement certain of the features described in the logical router 270a, 270b of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415. Thus, based on the topology and associated forwarding table of the virtual network 401, traffic from I4 and I5 to I3 passed through I2.

Meanwhile, FIG. 4B illustrates an example topology of the substrate network 402 associated with the virtual network 401. The substrate network includes computing node A 420, computing node B, and a Route Manager 424. Substrate nodes A and B are each associated with a Communication Manager 426, 428. Node A is simulating the operation of virtual components I2, I3 and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual network user can wish to control how traffic is routed in the substrate network. However, rather than giving the user access to the substrate network, which could put other users at risk or otherwise compromise security, a data center operator can propagate network configuration or virtual network characteristics specified by the user for the virtual network to the substrate network. This propagated data can be used in generating routing paths in the substrate network, thus allowing the user to affect substrate routing without exposing the substrate layer to the user.

Route Selection on Overlay/Virtual Network

Figure 5A:
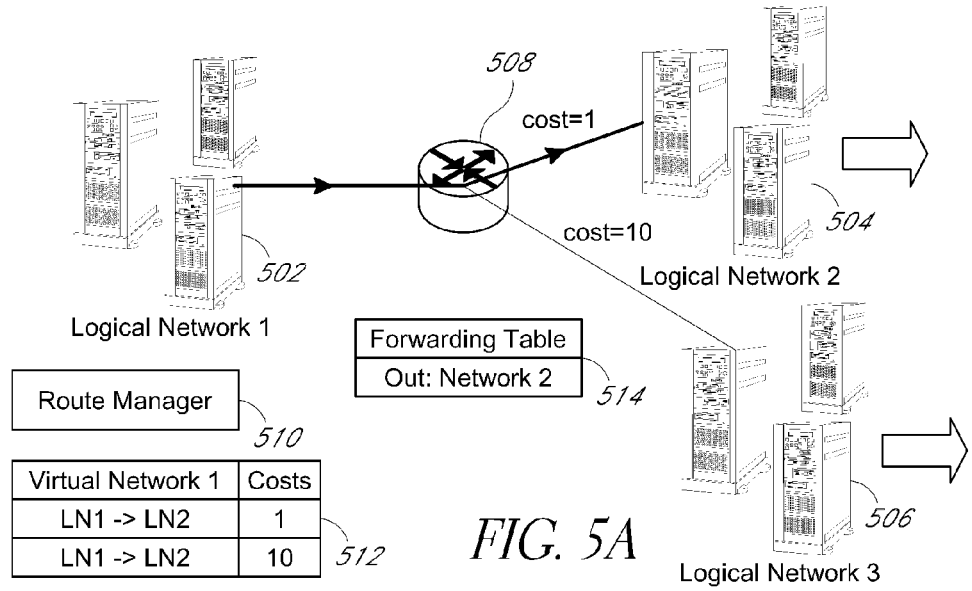
FIGS. 5A and 5B illustrate a virtual route selection propagated to the substrate network.
Figure 5B:
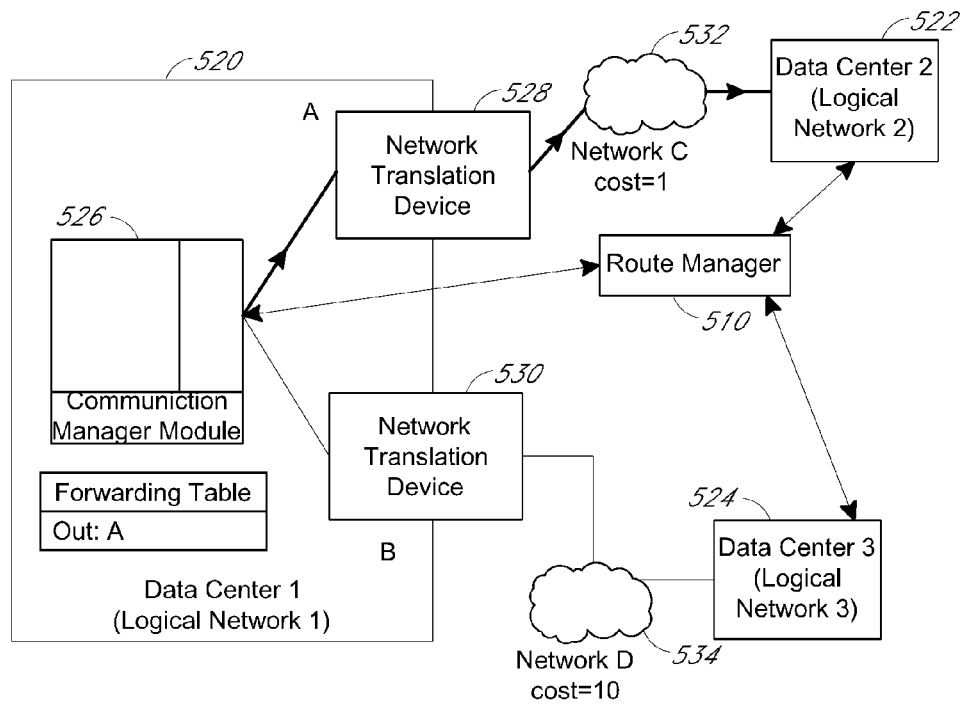

FIGS. 5A and 5B illustrate a virtual route selection propagated to the substrate network. FIG. 5A illustrates a virtual network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual network for LN2, and used only in some situations, such as for handling overflow from LN2.

Referring back to FIG. 5A, the user can specify preferred routes through the virtual network and/or characteristics or costs associated with the virtual components, such as monetary costs, packet loss rates, reliability rate, and/or other metrics. These characteristics can be assigned to the virtual components, such as the virtual computing nodes, node links, logical routers/switches or the like. The Route Manager 510 can then determine routing tables 512 and/or forwarding tables 514 for the virtual network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual network. In some embodiments, the network translation devices can translate between a first addressing protocol and a second addressing protocol. For example, if the virtual network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual network configuration data to the substrate, and using that configuration data in substrate route calculation, a mechanism is provided for a virtual network user to affect substrate routing. In some embodiments, the virtual configuration data can be used in determining association of the virtual components with the substrate components. For example, components of the same virtual network can be associated with the same substrate computing node or on computing nodes connected to the same switch in order to minimize or otherwise improve substrate network traffic. Configuration data can also be provided the other way and, in some embodiments, the user and/or virtual network can be provided with additional substrate information, such as characteristics of the underlying associated substrate components (e.g. performance, costs) in order to make more informed routing decisions.

Figure 6:
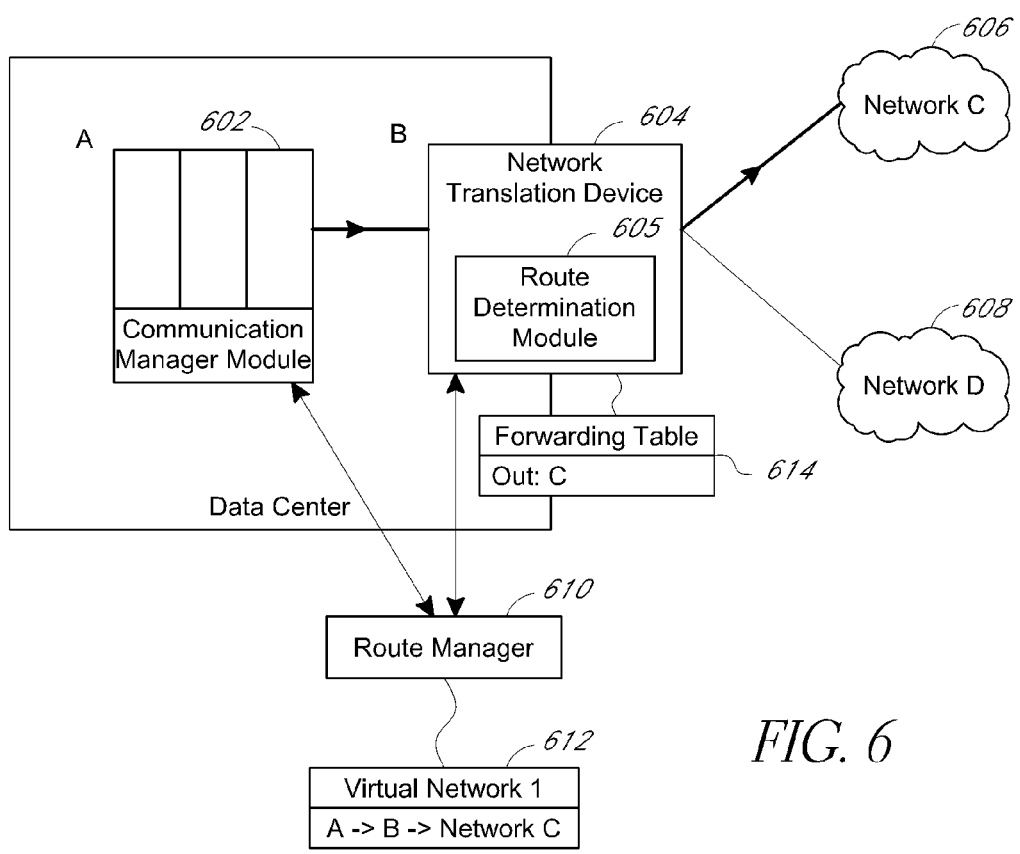
FIG. 6 illustrates an example embodiment of a substrate network, wherein a network translation device determines routes into or out of a virtual network.

FIG. 6 illustrates an example substrate network wherein a network translation device determines routes into or out of a virtual network. In FIG. 6, a communication, such as a data packet, leaves computing node A, which is associated with a virtual network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual networks, such that data for one virtual network can be sent through network C, while another virtual network sends data through network D. In some cases, network packets with the same source and/or destination are sent by different networks based on the associated virtual network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an the source address of an outgoing packet. In some embodiments, the Route Manager generates control signals or messages for coordinating traffic on the substrate network for the various techniques described above.

Virtual Network Route Selection Process

Figure 7A:
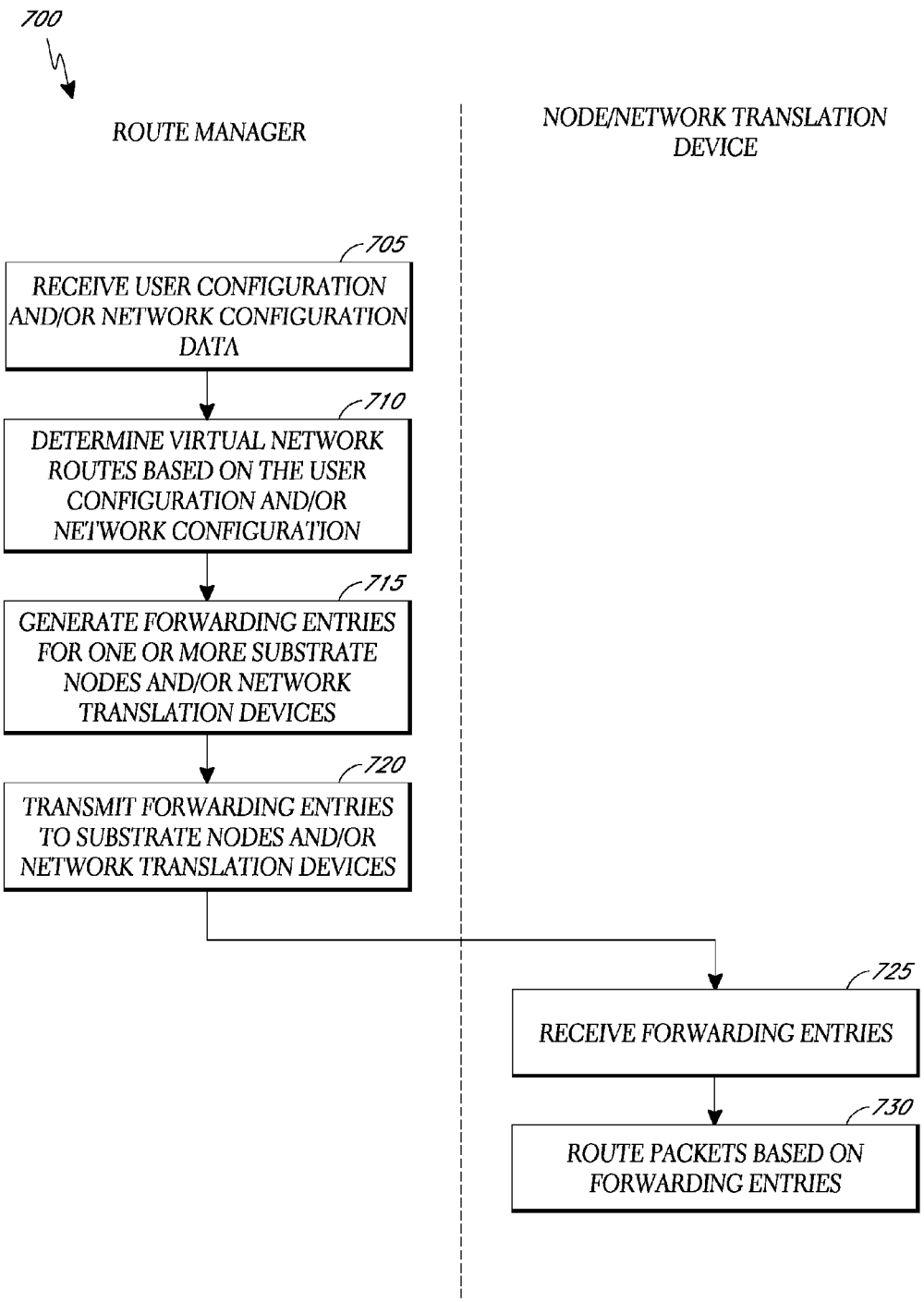
FIG. 7A illustrates a flow diagram for a process of propagating virtual routes to a substrate network.

FIG. 7A illustrates a flow diagram for a process 700 of propagating virtual routes to a substrate network usable in the example networks described above. The virtual routes can be based on network configuration data provided by a virtual network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual network. In some embodiments, the configuration data can specify associated costs for traversing components of the virtual network, such as links and/or nodes. These costs can be based on monetary costs, packet loss rates, reliability rate, and/or other metrics. These costs can be provided by the user to configure the virtual network provided by the data center operator. However, costs and other network configuration data can come from the data center operator themselves in addition to or instead of from the user. For example, the data center operator can use the virtual network to provide feedback to the user on routing costs, such as by associating monetary use costs for the substrate computing nodes and/or components. In one example, the data center operator can specify a high cost for a high speed network link or high powered computing node so that the virtual network user can take into account that cost in configuring the virtual network.

At block 710, the Route Manager module determines virtual network routes based on the user configuration and/or network configuration data. In some embodiments, routing protocols or the route determination algorithms of the routing protocols, such as BGP, OSPF, RIP, EIGRP or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component.

However, as discussed above, network traffic can also be coordinated for substrate components without a Communication Manager using instead, for example, a NAT device or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
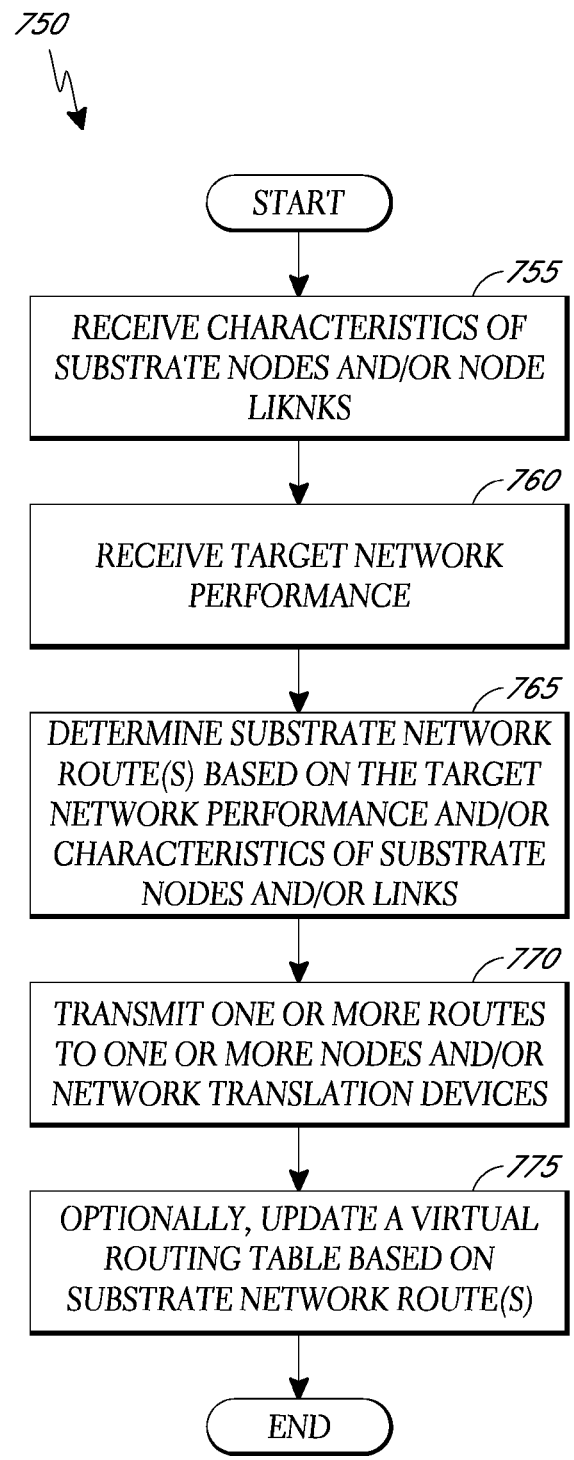
FIG. 7B illustrates a flow-diagram for a process of determining substrate routing based on target performance characteristics of the associated virtual network.

FIG. 7B illustrates a flow-diagram for a process 750 for determining substrate routing based on target performance characteristics of the associated virtual network usable in the example networks described above. In some instances, the Route Manager can optionally generate a virtual routing table for the virtual network before determining substrate routing. The virtual routing table can be used to determine virtual routing paths, allowing optimization of network traffic by selective association of the virtual network components with substrate computing nodes, such as by taking into account physical location and virtual network traffic patterns. However, generation of the virtual routing table is not necessary as the substrate routes can be determined independently of the virtual routes, as will be described below. In addition, user configuration and/or network configuration data provided by the user can be used to describe the virtual network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability and/or the like. These characteristics can be used in a cost function for determining substrate routing paths. This information can be kept by the Route Manager or data source accessible by the Route Manager.

At block 760, the Route Manager receives a target network performance for the virtual network. The target performance can be based on a purchased service level by the user, user history, security data or the like. For example, a service level purchased by a user can have minimum bandwidth, latency, or quality of service requirements. In another example, a user can be a new customer with an unknown payment history such that the user is provisioned on a "slow" virtual network in order to minimize incurred expenses in case the user fails to pay. In another example, a user identified as carrying dangerous or prohibited traffic, such as viruses, spam or the like, can be quarantined to particular substrate components. During quarantine, the virtual network components can be assigned to specialized substrate components with more robust security features. For example, the substrate components can have additional monitoring functionally, such as a deep-packet scanning ability, or have limited connectivity from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance. For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual network routing table based on the substrate routes, the virtual network can stay logically consistent with the behavior of the substrate network. Thus, users won't necessarily be confused by discrepancies in the virtual routing.

Reputation Based Networking

FIG. 8 depicts a method 800 for reputation-based networking. The method 800 can be implemented by any of the systems described above. In addition, the method 800 can be implemented by any of the systems described below with respect to FIGS. 9, 10, and 13. As discussed above, routes can be maintained for virtual networks and substrate networks. Further, as described above, routing or other network decisions can be made based on criteria other than traditional routing information. Additionally, packets can be forwarded and switched by both or either virtual and physical routers. Generally, method 800 illustrates that, in some embodiments, a network traffic request received from a network participant may be performed, ignored, or delayed based on the reputation of the network participant.

In block 810, a network traffic request is received from a network participant. The request can be a network data plane request, such as a transmission request (e.g., a request to forward or switch a packet), a control plane request, such as a network routing announcement (e.g., the announcement of the netblock or the announcement of a routing change), or any other appropriate request. As noted herein, the network participant can be a network transit provider, a network packet sender associated with an IP address, an internet service provider (ISP), an autonomous system, or any other a network service provider. Some network participants can fall into more than one category. For example, a network transit provider may also be associated with an ISP.

In block 820, the reputation for the network participant is determined. In some embodiments, determining the reputation can include calculating a reputation score or level based on information that will be described in greater detail below. In some embodiments, determining the reputation can include accessing or retrieving a previously determined reputation score or level for the network participant. The network participant score can be identifiable by the network address of the participant or by any other appropriate identifier.

By way of overview, in some embodiments, the reputation score or level for the network participant can be based on a number of factors, including packet round-trip time, packet loss for the network participant, the number of routing change announcements made over certain periods of time, payments made by the network participant, the reputation of other network participant's affiliated with the network participant (e.g., other ISPs within the same netblock), or any other appropriate factor. A network participant's reputation score at any particular time can be adjusted based at least in part on a history of good or bad behavior, recent good or bad behavior, and a decay, such as an exponential decay or other smoothing function, over time of the effects of previous behavior. More details about the determination of reputation scores for network participants are given elsewhere herein.

At least in part based on the reputation for the network participant, a network decision is made for the request received in block 810. The decision can take many forms. For a network participant that has a good (e.g., above-average) reputation, the action requested can be performed (e.g., immediately) in block 841. If the network participant has an average reputation, in some embodiments, the request may still be performed, but after a configurable delay in block 842. For network participants with poor (e.g., below average) reputations, it is possible that the requested action can be ignored in block 843. Other actions can also be taken based on the reputation and/or the network traffic request. For example, in some embodiments, if the network traffic request is either performed after a delay or is ignored completely, then the network participant can be sent a message indicating that the requested action was delayed or ignored, perhaps with an indication as to why (e.g., a poor reputation, a historically bad reputation, recent undesirable activity, or the like).

Multiple network traffic requests can be received from the same network participant over time. As such, an action can be taken on each individual network traffic request based on the reputation of the network participant at the time that the request is received. Further, in some embodiments, as the network participant provides more requests, and if those requests are not associated with undesirable behavior, then the reputation of the network participant can improve. As the network participant's reputation improves, the network participant's requests can be fulfilled more quickly. Embodiments of this change in reputation over time are described below with respect to FIG. 12.

The method 800 can be executed in conjunction with a Border Gateway Protocol (BGP). Using BGP, a routing system can maintain a table of IP networks, designating network reachability among autonomous systems (AS). Certain network participants, such as transit providers, ISPs, and the like, exchange update messages or announcements about destinations to which the network participants offer connectivity. In some embodiments, a network traffic request received in block 810 can be a BGP update message received from a network participant. A routing system receiving such a BGP update can proceed by making a routing or other network decision (such as a routing table maintenance decision) based at least in part on the reputation of the network participant sending the BGP update message, in block 830. Although embodiments the method 800 is described herein in the context of BGP, the method 800 can also be used with other networking protocols, including routing protocols such as the Routing Information Protocol (RIP), the Open Shortest Path First (OSPF) protocol, and the like.

The blocks of method 800 are shown as progressing and particular order. It is not necessarily the case that the method will progress in this order in some embodiments. For example, the reputation for a network participant can be based on prior activity of that network participant. Therefore, in some embodiments, the reputation for a network participant can be updated over time as that network participant requests and performs actions in the network. Therefore, in some embodiments, the reputation for the network participant is determined before block 810.

Figure 9:
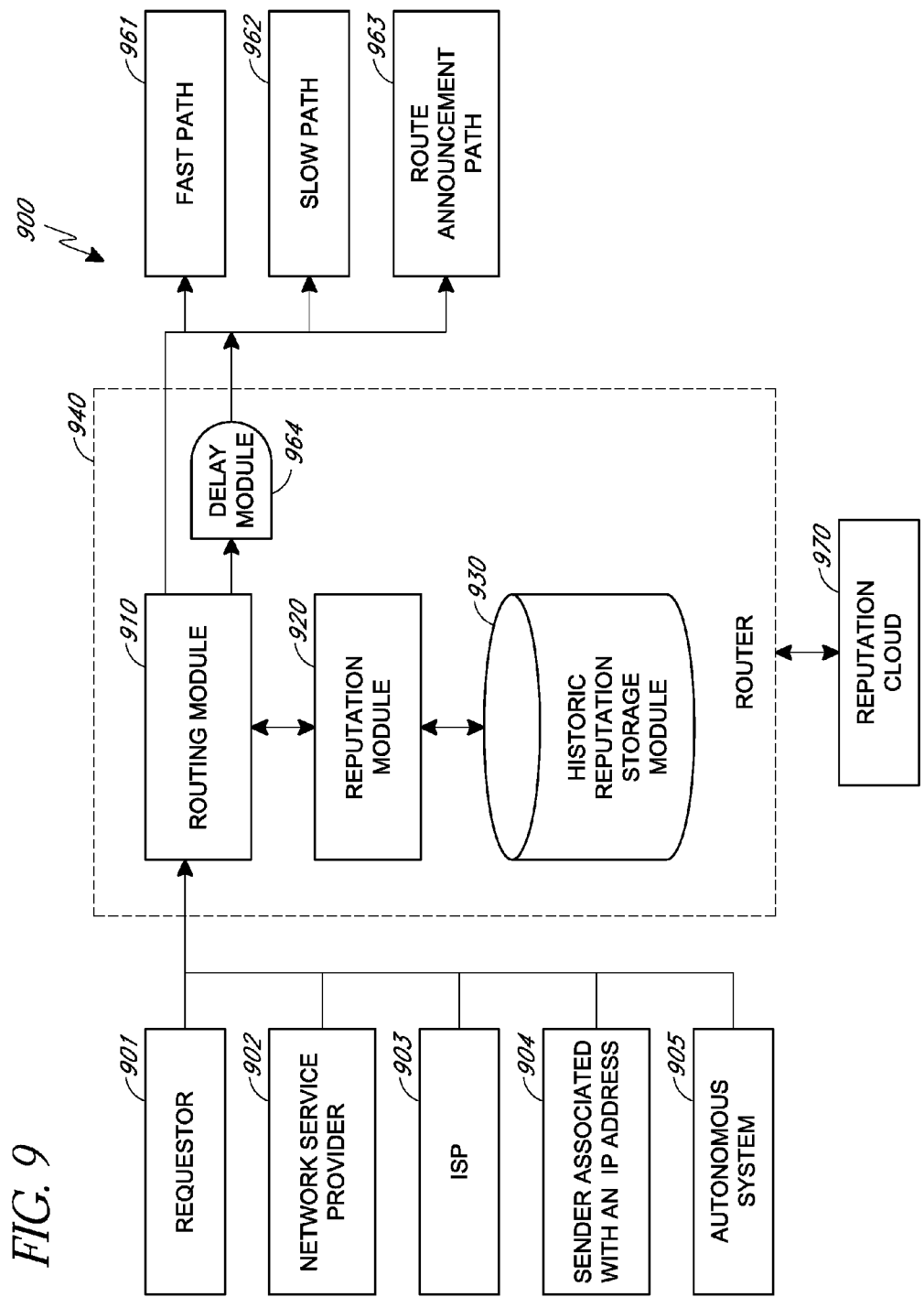
FIG. 9 depicts a first example system for reputation-based networking.

FIG. 9 depicts a first example system 900 for reputation-based networking. The system 900 can implement the features of the method 800 described above. On the left are depicted a number of different types of network participants. These network participants include, in the depicted embodiment, a requester 901, a network service provider 902, an ISP 903, a sender associated with IP address 904, and an autonomous system 905. Any of these or other network participants can request certain network routing actions, as described above. A particular network participant can also be associated with more than one of the network participant types. These requests can be sent to a routing module 910 that is part of a router 940. Each of the network participants can include physical machines, virtual machines, one or more processes running on a computer, or any other module, entity, or combination thereof.

The depicted embodiment of the router 940 includes a routing module 910, a reputation module 920, and a historic reputation storage module 930. Each of the routing module 910, the reputation module 920, and the historic reputation storage module 930 can be part of a single physical or software router 940. Each of the modules 910, 920, and 930 can be virtual machines running on a single computer system or distributed across multiple computer systems. Furthermore, each of the modules 910, 920, and 930 can run on a single processor or on multiple processors. In some embodiments, router 940 can be a substrate router, such as any of the edge routers 125*a*-125*c* or core routers 130*a*-130*c* described above. In some embodiments, the router 940 can instead or also include other components described above, such as a communication manager, such as VM Communication Manager 109*a*-109*d*, ONM Communication Manager 150, a routing manager 336, or the like. In still other embodiments, the router 940 can be a logical router, such as logical router 270*a*-270*b*, or 508.

A reputation cloud 970 can also be coupled to the router 940 in certain embodiments in order to provide the router 940 with reputation information for network participants. In some embodiments, the reputation cloud 970 can provide reputation information to the router 940. The router 940 can then make reputation determinations in the reputation module 920 based at least in part on the information from the reputation cloud 970.

The reputation cloud 970 can take many forms. For example, in some embodiments, the reputation cloud 970 can include a webpage or other user interface that provides functionality for network administrators or engineers (or other users) to vote on the reputation of network participants. For example, in a managed network, network administrators may be monitoring and attempting to resolve problems with various network participants. As part of the resolution process, the network administrator may be able to vote on the reputation of the network participant, indicating that the network participant is currently having trouble, has resolved past issues, is likely to resolve past issues, or any other appropriate voting. Voting functionality can take a variety of formats, such as a star rating system, a thumbs up or thumbs down rating system, or the like. The reputation cloud can aggregate the votes from users in the reputation cloud and provide the aggregate vote on the network participants to the router 940. Further, in some embodiments, the reputation cloud 970 includes a social network or social networking site. As such, the reputation of a network participant may be determined in part based on the number of "friends," "associates," "followers," etc. that the participant has on the social networking site.

In the abstract reputation networking system 900, routing module 910 can handle the network traffic request in various ways. For example, in some embodiments, a network participant with a good reputation that requests a data plane action, such as forwarding a packet, can have that packet forwarded along a fast path 961. If the network participant does not have a good reputation, then the packet can first be delayed at delay module 964 and then sent along a fast path 961 or along a slow path 962. If the network participant has a poor reputation, then the packet can simply be dropped or ignored (not shown). If the requested network action is a control plane request, such as a routing change announcement, if the network participant has a good reputation, then the route can be announced (e.g., immediately) on route announcement path 963. If the network participant does not have a good reputation, then the routing change can first be delayed at module 964 and then announced along route announcement path 963. If the network participant has a bad reputation, then the routing announcement can simply be ignored (not shown).

In some embodiments, delay module 964 is separate from the routing module 910 and reputation module 920. In some embodiments, delay module 964 can be implemented as part of routing module 910 or reputation module 920. The fast path 961 can be a path that is known to have a lower latency, packet loss, or other beneficial characteristic. The slow path can have a higher latency, packet loss, or other detrimental characteristic. The route announcement path 963 can be part of either or both of path 961 or 962 or can be separate. The fast path 961 and the slow path 962 can be selected in certain embodiments using the substrate routing techniques described above. In some embodiments, route announcement path 963 can be part of the routing module 910 or router 940 and announcing a route may include changing a routing table in the routing module 910 or router 940.

Figure 10:
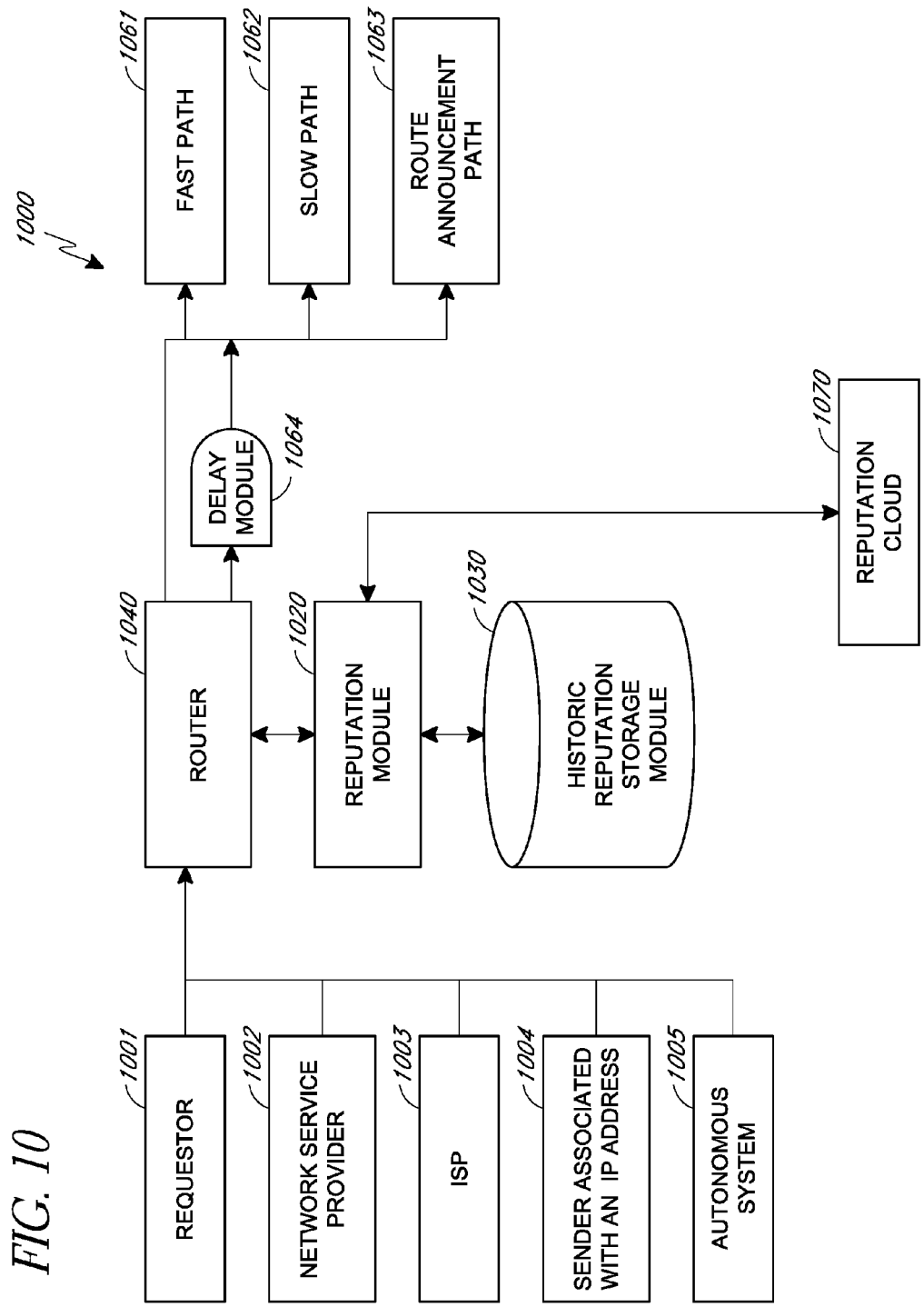
FIG. 10 depicts a second example system for reputation-based networking.

FIG. 10 depicts another example system 1000 for reputation-based networking. The system 1000 can also implement the features of the method 800. Likewise, the system 1000 can include any of the features of the system 900. For example, the system 1000 includes a router 1040, reputation module 1020, and historic reputation storage module 1030. These components can run on separate physical computers, as distinct virtual machines, or as separate processes. Additionally, the system 1000 can be accessed by the same network participants described above with respect to FIG. 9.

In some embodiments, router 1040 can be coupled to a reputation module 1020, as opposed to embodiments of FIG. 9 where a reputation module is part of the router. Further, in some embodiments, historic reputation storage module 1030 can be coupled to the reputation module 1020. In some embodiments, the reputation cloud 1070 can be coupled to the reputation module 1020. Each of the router 1040, reputation module 1020, delay module 1064, and historic reputation storage module 1030, may perform similar actions in similar ways as described with respect to FIG. 9. Router 1040 and reputation module 1020 can run on different physical computing systems or can run as separate processes in a single computing environment. Further, historic reputation storage module 1030 can run on a separate database server, file server, or other type of storage module. The reputation module 1020 can be coupled to the router 1040, historic reputation storage module 1030, and reputation cloud 1070 via any appropriate means, including wired connection, wired network, wireless connection, wireless network, private network, private Internet, public Internet, a combination thereof, or any other appropriate communication mechanism.

Figure 11:
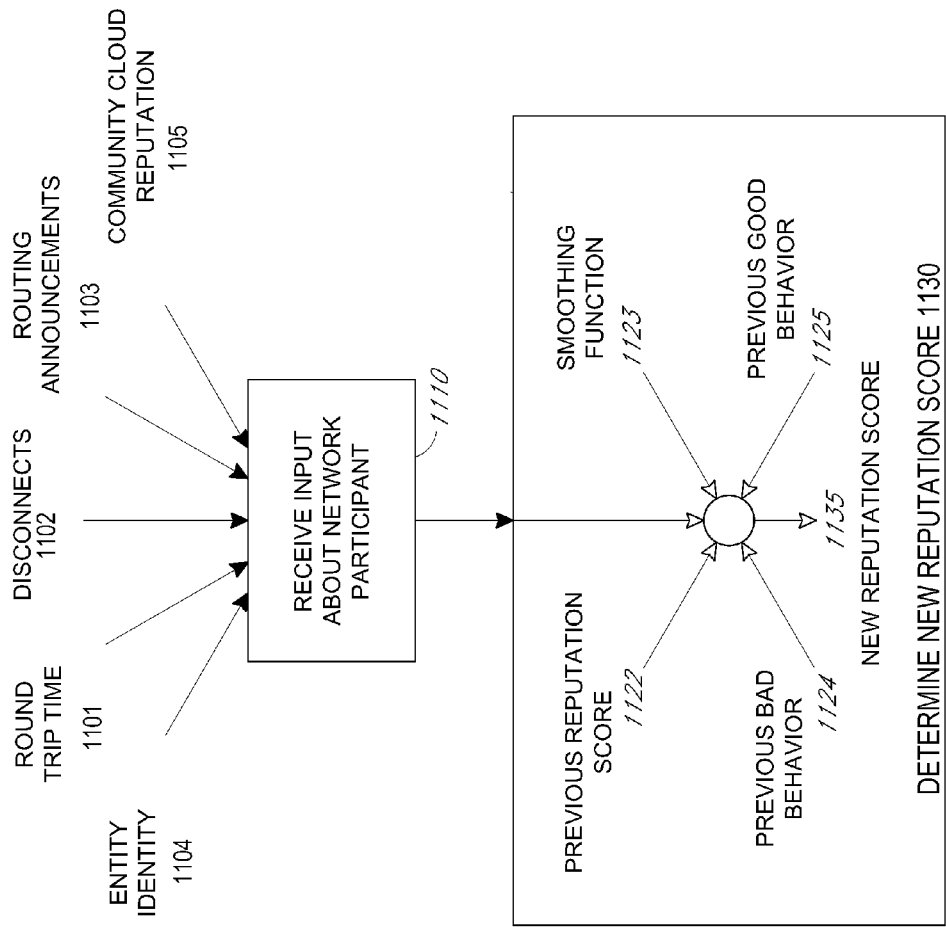
FIG. 11 illustrates example embodiments for determining reputation scores of network participants.

FIG. 11 illustrates example embodiments for determining reputation scores of network participants. The embodiments described with respect to FIG. 11 can be used in conjunction with any of the systems and methods described herein. In the depicted embodiment, numerous inputs to the reputation score calculation for a network participant are shown. For example, one possible input includes round-trip time 1101 for a data packet. The round-trip time 1101 can include the time that it takes to send a packet across the network and receive an acknowledgment from the other side. Another factor that can be taken into account for the reputation score or level 1135 of a network participant can be the number of disconnects 1102 during a particular time period. Additionally, in some embodiments, the number of routing changes announced 1103 within a particular time period can affect the reputation score or level. As represented by input 1104, in some embodiments, a network participant's identity can also effect reputation (e.g., some entities may have long-term or other relationships with the network provider that would bolster the network participant's reputation). Relatedly, a network participant may be able to pay for higher quality of service, regardless of the network participant's reputation. Another factor considered in the reputation score or level for a network participant, in some embodiments, is the community reputation 1105 collected from the community or cloud of other network participants or users.

Other factors than those shown can also be used to help determine reputation score or level. For example, the past behavior of a network participant can be used to assess or adjust a reputation score. If a network participant is a transit provider that is know to recover from fluctuating routing announcements more quickly than other network providers, for instance, then this prior good behavior can be considered when determining the network participant's reputation. In some embodiments, a transit provider that is known to recover quickly may suffer less of an effect on reputation for bad events, such as fluctuating announcements, than would a transit provider which is not known to resolve issues quickly. Further, the effect of bad events on a network provider's reputation score can be smoothed and/or decayed over time.

In block 1110, one or more of the inputs related to the network participant's reputation can be received, obtained, or otherwise accessed. Some of the inputs can be received by accessing data about the network participant that is available in log files or other history related to the network participant. In some embodiments, the round-trip time 1101 of a recent packet transmission, number of disconnects 1102, number of routing announcements 1103, or any other factor may be determined from log files or other history related to the network participant. Inputs 1101-1105 can also be received from other network participants, other routers, other routing modules, or any other appropriate source.

After receiving inputs about the network participants in block 1110, a new reputation score or level 1135 is determined at least in part based on the received input, in block 1130. For example, in some embodiments the new reputation score or level 1135 is calculated based on the previous reputation score or level 1122 and any inputs received as part of block 1110. In some embodiments, more than one previous reputation score or level 1122 is kept, along with information about when that reputation score or level was calculated or applied. As such, in some embodiments, multiple previous reputation scores 1122 can be used along with the received input about the network participant in order to determine a new reputation score or level 1135. For example, the new reputation score or level 1135 can be calculated based on an smoothing function 1123 of previous reputation scores 1122. In some embodiments, the rate of routing announcements may also be used to determine the reputation score for a network participant.

In some embodiments, previous bad behavior 1124 and previous good behavior 1125 can be stored along with timing information for the behaviors 1124 and 1125. The previous behaviors 1124 and 1125 can be used to help calculate the new reputation score or level 1135. For example, in some embodiments, more recent behaviors 1124 at 1125 may influence the new reputation score or level 1135 more significantly then do older behaviors 1124 and 1125. As discussed above, previous reputation scores 1122 and behaviors 1124 and 1125 can have an effect on the new reputation score or level 1135. The effect of previous reputation scores 1122 and behaviors 1124 and 1125 can smooth or decay exponentially over time, as reflected by smoothing function 1123. For example, as described with respect to FIG. 12, the effect on reputation of a single bad event, such as a flood of routing announcements, may be decayed or smoothed over time. Other mathematical relationships are also possible. For example, in some embodiments the effects of one or more of the previous reputation scores 1122 and previous behaviors 1124 and 1125 can have a linear, declining relationship with newly created reputation scores 1135. For example, the effects of previous reputation scores 1122 and behaviors 1124 and 1125 can decline linearly over a period of one month, one week, one day, or any other appropriate amount of time. Additionally, the reputation of a network participant can increase linearly, exponentially, logarithmically, or according to some other function of good behavior over time.

In some embodiments, if bad behavior 1124 or good behavior 1125 is consistent, then new behavior contrary to that consistent behavior may not have a strong effect on a new reputation score or level 1135. For example, if the network participants, such as a substrate network, has a history of announcing inordinate numbers of routing changes (e.g., more than 10, 20, 30, or 60 per hour), then even if the network participant temporarily decreases the number of routing changes that it is announcing, its reputation score or level 1135 may still be dominated by the previous bad behavior. Similarly, in some embodiments, if a network participant typically exhibits good behavior, then that good behavior may dominate in the determination of a new reputation score or level 1135. For example, if a network rarely or never announces an inordinate number of routing changes per a given time period (e.g., an hour), then even if it does announce an inordinate number of routing changes in a particular time period, its new reputation score or level 1135 may not be heavily effected by this temporary change in behavior.

The information about a network participant's reputation and the calculation of the reputation score or level can take place at a virtual machine, logical router, substrate router, communication manager, or any other appropriate process or device, such as those discussed elsewhere herein.

Figure 12:
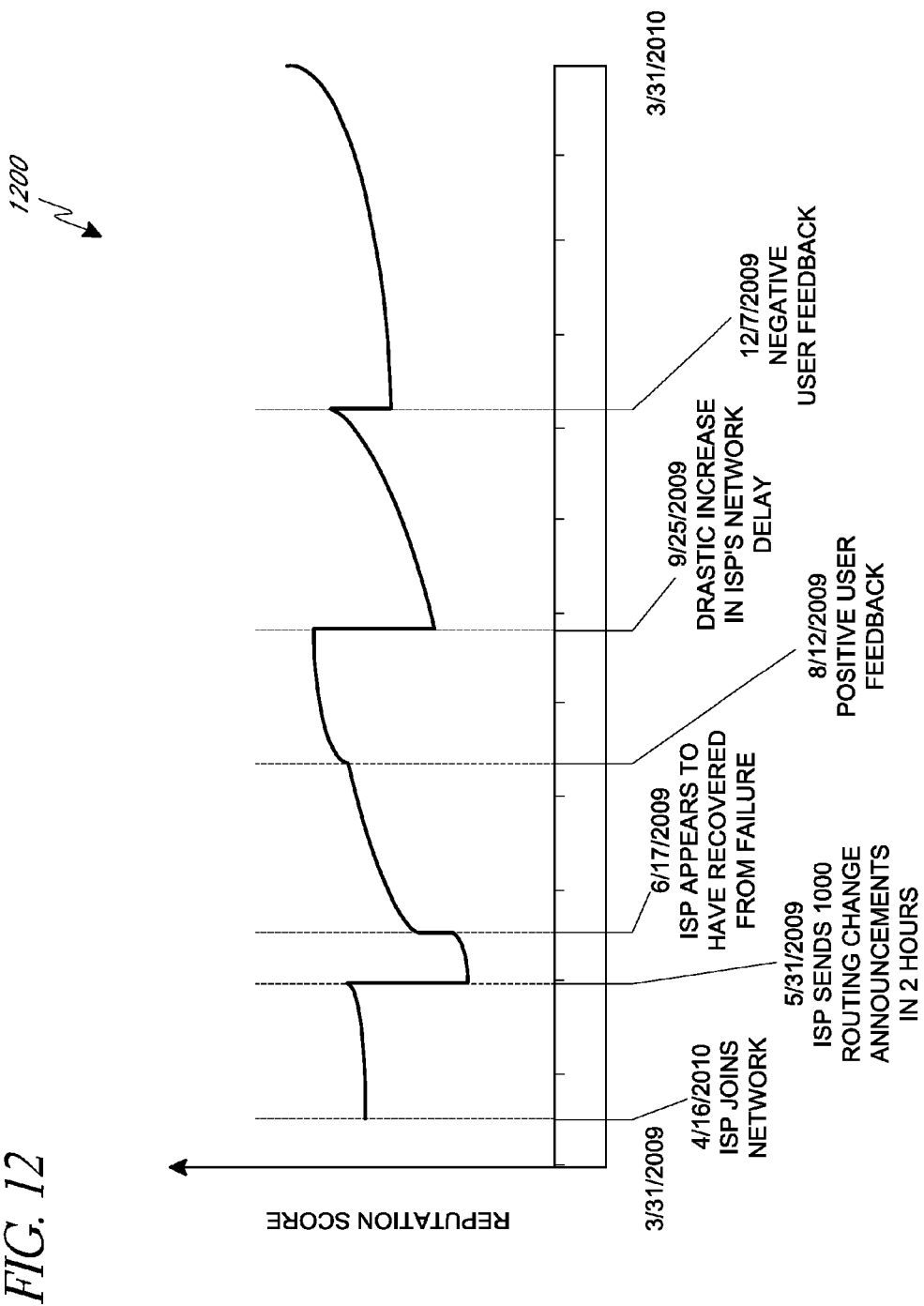
FIG. 12 depicts the change in a reputation score for an ISP over time.

FIG. 12 depicts change in an example reputation score or level for an ISP over time, illustrating concepts of the systems and methods described above. In this example, on Apr. 16, 2009, the ISP joins the network. After the ISP has no significant events related to its reputation over the next month and a half, its reputation increases slightly. On May 31, 2009, the ISP sends 1000 routing change announcements in two hours. After this event, the reputation score or level for the ISP drops significantly. Over the next 17 days, the ISP does not have any other significant behavior, and its reputation score or level increases slightly. On Jun. 17, 2009, it is noted that the ISP appears to have recovered from its previous failure, in part due to the fact that it has not had any significant behavioral events in the last 17 days. This notation can be made by network administrator or as part of an automated process running, for example, in a reputation module.

After it appears that the ISP has recovered from its previous failures its reputation increases significantly on that day and continues to increase over time. On Aug. 12, 2009, as part of input from the reputation cloud, such as those discussed herein, a user provides positive feedback for the ISP, such as noting that it has excellent round-trip packet time. On and after Aug. 12, 2009, the ISPs reputation continues to increase, but does so at a greater rate. On Sep. 25, 2009, the ISP experiences a drastic increase in its network delay, thus causing a drastic reduction in its reputation. After this point, with no other significant events, the ISPs reputation continues to increase over the next two and half months. On Dec. 7, 2009, the ISP receives negative user feedback via the reputation cloud. This causes the reputation of the ISP to drop drastically on that day. After this point with no other significant events, the reputation of the ISP continues to increase. With no other significant events over three months, the reputation score or level for the ISP has increased to a level greater than it had been before.

The examples of the rates of increase and decrease and the amount of increase and decrease of the reputation score or level, due to the particular events and over the particular amounts of time, are merely examples of various embodiments herein. Other rates, events, and formulas for increase can also be used.

Figure 13:
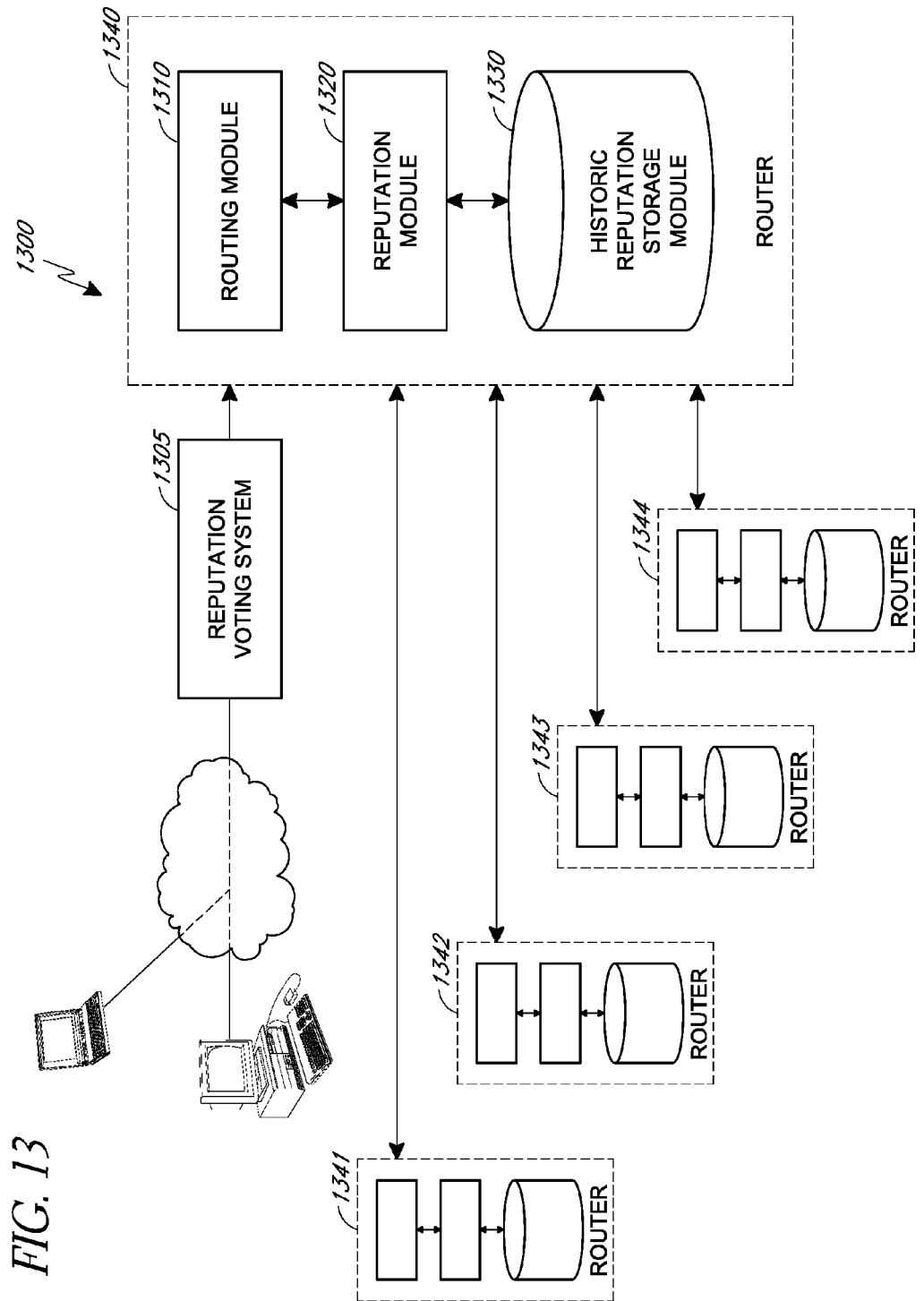
FIG. 13 depicts a third example system for reputation-based networking.

FIG. 13 depicts another example system 1300 for reputation-based networking. The system 1300 can also implement the features of the method 800. Likewise, the system 1300 can include any of the features of the systems 900 and 1000. In the example system, there are multiple routers 1340-1344, each of which can have a routing module 1310, a reputation module 1320, in the historic reputation storage module 1330. Various embodiments of these modules 1310-1330 are discussed elsewhere herein. In some embodiments, multiple routers 1340-1344 communicate reputation information to each other. In doing so, the various reputation modules 1320 of the routers 1340-1344 can provide aggregated reputation information for network participants. For example, in some embodiments, if one router 1341 notices bad behavior for a network participant, then it may inform the other routers 1340 and 1342-1344. Thus, all the routers 1340-1344 may be able to determine reputation scores and/or make reputation determinations for network traffic requests based on reputation information from other routers. As such, a reputation module may be able to use reputation information from more than just the network participants with which it has interacted.

Further, as depicted in FIG. 13, a reputation voting system 1305 can be coupled to a router 1340 and one or more computers 1350. The reputation voting system, as discussed above, can take input from network administrators or other people using computers 1350 as well as from any processes coupled to the reputation voting system 1305 (not pictured). In some embodiments, reputation information about network participants can be collected from users using computers 1350 or from automated processes running on computers 1350 or on routers 1340-1344 and collected on reputation voting system 1305. Reputation voting system 1305 can, in some embodiments, also include a webserver that provides web-based input mechanisms for users to enter reputation information on computer 1350. The reputation voting system 1305 can provide to the routers 1340-1344 reputation cloud information about network participants. As discussed elsewhere herein, reputation cloud information about network participants can be used to help make decisions about network traffic requests.

TERMINOLOGY

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for performing reputation-based networking, the system comprising:
 a computer system comprising computer hardware, the computer system programmed to implement:
  a reputation module configured to provide functionality for assigning a reputation level to a network service provider, the reputation module further configured to store an indication of the reputation level in computer storage; and
  a routing module configured to receive a network traffic request from the network service provider, the routing module configured to:
   access the reputation module to identify the reputation level of the network service provider; and
   determine whether to delay or ignore the network traffic request at least in part on the reputation level, wherein the reputation level is a calculation of an average or below average reputation.

2. The system of claim 1, wherein the reputation level is at least partially based on whether the network service provider has recovered from a failure.

3. The system of claim 1, wherein the reputation level comprises a voted reputation of the network service provider.

4. The system of claim 1, wherein the reputation module provides a user interface that allows a user to provide a rating for the network service provider; and wherein the reputation module assigns the reputation level at least in part based on said rating.

5. The system of claim 1, wherein the reputation level is determined at least in part based on prior network routing announcements.

6. The system of claim 1, wherein the network traffic request comprises a network routing announcement.

7. The system of claim 1, wherein the network service provider is selected from the group consisting of:
 a network transit provider;
 a network packet sender associated with an IP address;
 an ISP; and
 an autonomous system.

8. The system of claim 1, wherein the computer system comprises a plurality of computing devices.

9. A method for performing reputation-based networking, the method comprising:
 by a computer system comprising computer hardware:
  automatically determining a reputation level for a network participant based at least in part on information related to the network participant's prior network activity;
  receiving a network routing announcement from the network participant, the network routing announcement configured to update a routing table on one or more routers; and
  determining whether to delay or ignore the routing announcement based at least in part on the determined reputation level, wherein the determined reputation level is an indication of an average or below average reputation.

10. The method of claim 9, wherein the network participant's prior network activity comprises a number of routing changes announced by the network participant within a second time period.

11. The method of claim 9, wherein the network participant's prior network activity comprises a voted reputation of the network participant.

12. The method of claim 9, wherein the network participant's prior network activity comprises whether the network participant has recovered from a failure.

13. The method of claim 9, wherein the network participant's prior network activity comprises historic performance of the network participant.

14. The method of claim 9, wherein the network participant's prior network activity comprises a network transit time associated with the network participant.

15. The method of claim 9, wherein the reputation level is determined at least in part based on an entity associated with the network participant.

16. The method of claim 9, wherein effect on reputation level of the information related to the network participant's prior network activity declines over time.

17. A non-transitory computer-readable storage medium comprising computer-executable instructions for performing a method of reputation-based networking, the method comprising:
   automatically assessing network behavior associated with a network participant;
   determining a reputation level for a network participant based at least in part on the automatic assessment of network behavior;
   receiving a routing announcement request from the network participant; and
   determining whether to delay or ignore routing announcement request at least in part on the determined reputation level, wherein the determined reputation level is an indication of a below average reputation.

18. The non-transitory computer-readable storage medium of claim 17, wherein the routing announcement request comprises a BGP routing update.

19. The non-transitory computer-readable storage medium of claim 17, wherein the routing announcement request comprises a request to withdraw a route.

20. The non-transitory computer-readable storage medium of claim 17, wherein the routing announcement request comprises a request to update a route.

21. The non-transitory computer-readable storage medium of claim 17, wherein the reputation level is automatically assessed at least in part based on prior routing announcement requests.

22. The system of claim 1, wherein the network service provider's reputation level is based, at least in part, on a number of routing changes announced by the network service provider within a time period.

23. The non-transitory computer-readable storage medium of claim 17, wherein the network participant's reputation level is based, at least in part, on a number of routing changes announced by the network participant within a time period.

* * * * *